United States Patent [19]

Beck et al.

[11] Patent Number: 4,523,735
[45] Date of Patent: Jun. 18, 1985

[54] MIRROR SWING LOCK MECHANISM

[75] Inventors: Marlin E. Beck, Allentown; Robert W. McFarland, Pennsburg, both of Pa.

[73] Assignee: Delbar Products, Inc., Perkasie, Pa.

[21] Appl. No.: 574,981

[22] Filed: Jan. 30, 1984

[51] Int. Cl.³ .............................................. A47G 1/24
[52] U.S. Cl. .................................. 248/476; 248/475.1; 248/479
[58] Field of Search ............ 248/476, 477, 478, 475.1, 248/479, 480, 484, 486, 487, 900, 205.1; 350/307

[56] References Cited

U.S. PATENT DOCUMENTS

| | | | |
|---|---|---|---|
| 3,118,965 | 1/1964 | Jones | 248/477 |
| 3,322,388 | 5/1967 | Budreck | 248/486 |
| 3,346,229 | 10/1967 | Carson | 248/477 |
| 3,501,122 | 3/1970 | Barker | 248/486 |
| 3,730,474 | 5/1973 | Bowers | 248/478 |
| 3,778,015 | 12/1973 | Holzman | 248/475.1 |
| 3,833,198 | 9/1974 | Holzman | 248/476 |
| 4,120,476 | 10/1978 | Bourassa et al. | 248/480 |
| 4,125,244 | 11/1978 | Luckey | 248/478 |
| 4,394,066 | 7/1983 | Sharp | 248/475.1 |

FOREIGN PATENT DOCUMENTS 2504872  11/1982  France .................... 248/476

Primary Examiner—J. Franklin Foss
Assistant Examiner—Ramon O. Ramirez
Attorney, Agent, or Firm—Reising, Ethington, Barnard, Perry & Milton

[57] ABSTRACT

The present invention relates to a mounting mechanism for a mirror of the type adapted to be supported on an exterior surface of a vehicle and, more specifically, a mounting mechanism which allows the mirror and its support mechanism to be swung from its normal rearward viewing position to prevent damage to the mirror and its supporting structure.

16 Claims, 14 Drawing Figures

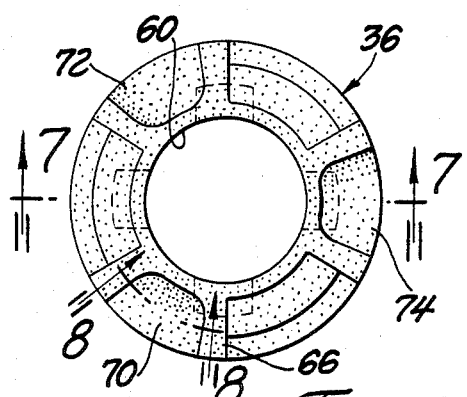
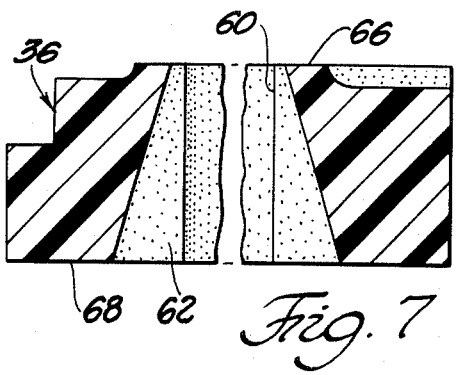
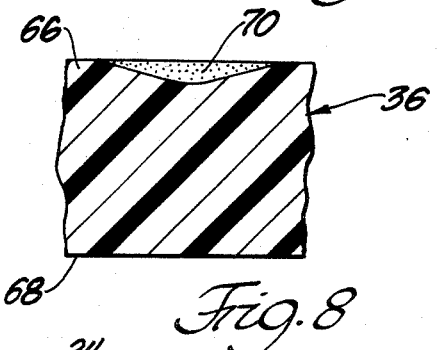
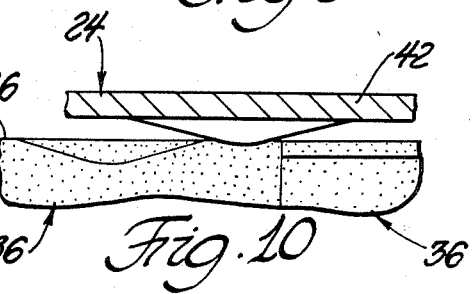
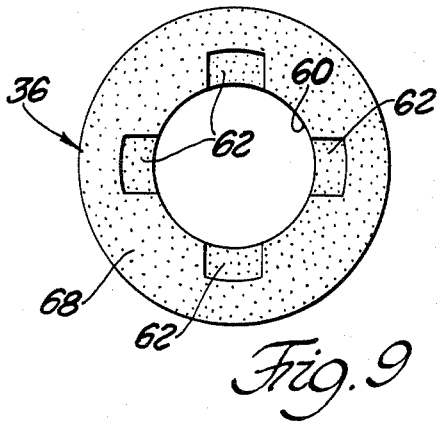
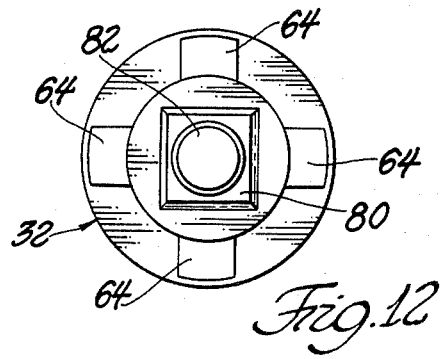
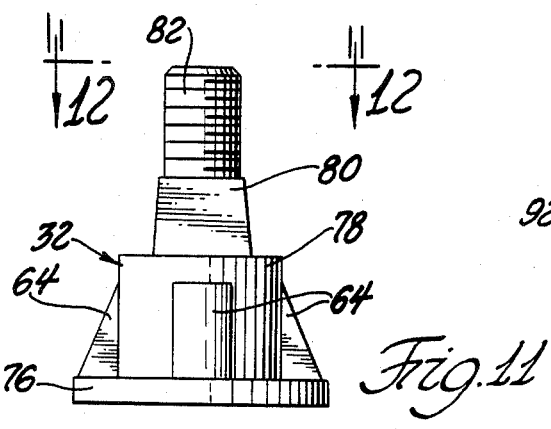
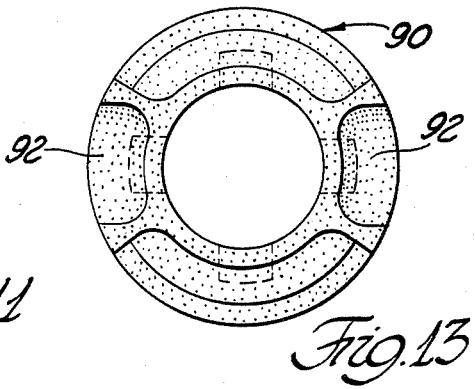

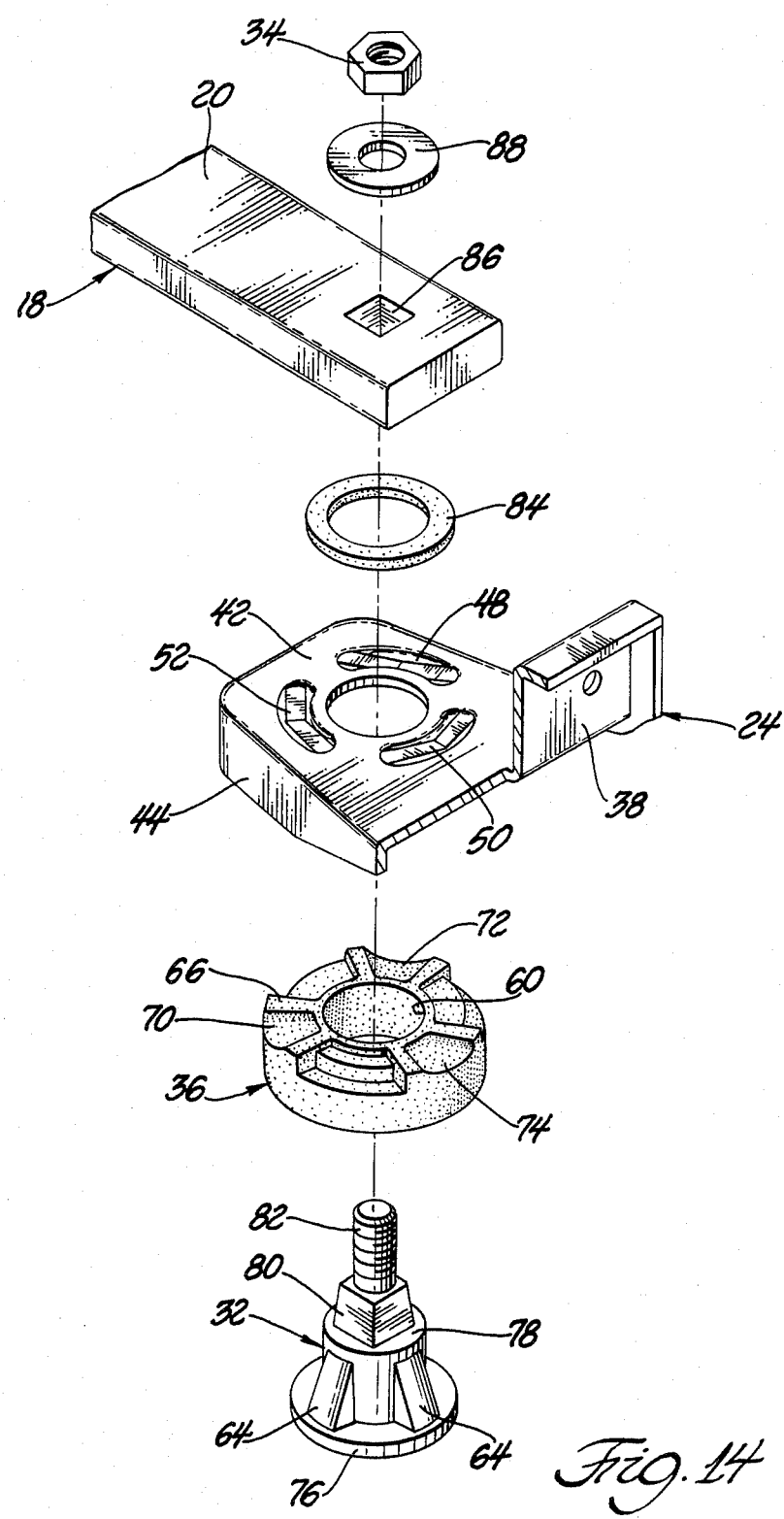

MIRROR SWING LOCK MECHANISM

TECHNICAL FIELD

The present invention relates to a mounting mechanism for a mirror of the type adapted to be supported on an exterior surface of a vehicle and, more specifically, a mounting mechanism which allows the mirror and its support mechanism to be swung from its normal rearward viewing position to prevent damage to the mirror and its supporting structure.

BACKGROUND ART

Mirror mechanisms of the type to which the subject invention generally relates are shown in U.S. Pat. Nos. 3,119,591 Malecki and 3,730,474 Bowers both of which are assigned to the assignee of the present invention. Mirror mounting mechanisms of the type to which the aforenoted patents as well as the subject invention relate have come to be termed "mirror swing lock mechanisms" which generally is intended to describe a mirror mounting mechanism wherein the mirror is normally positioned in a laterally extended position for normal rear viewing but which mechanism also permits the mirror support structure to be swung about a pivot axis to a position in which the mirror and mounting mechanism are generally flat against the side of the vehicle to prevent the former from being damaged. Such swing lock mechanisms also include detent devices which locate the mirror support arm in its normal laterally extended position for rearward viewing through the mirror.

In general, such swing lock mechanisms are used with larger mirrors of the type used on various types of trucks or heavy duty vehicles. Such truck mirrors are particularly susceptible to damage since they normally are mounted so as to extend laterally a considerable distance from the vehicle to permit adequate rear view sighting. Such truck mirrors are subject to being damaged by striking objects either during normal operation of the vehicle or when the vehicle is being itself transported. In either case, it is desirable that the mirror support mechanism fold back against the vehicle under conditions when it either strikes an object or to prevent it from otherwise being damaged during transportation of the vehicle itself.

Prior type mirror swing lock mechanisms have been less than completely satisfactory for several reasons. First, such mechanisms have been relatively complicated and have involved numerous parts which, in turn, have made such mechanisms difficult to assemble and, therefore, costly. Thus, it is applicants' first object to greatly simplify such a swing lock mechanism. Next, there have been relatively severe size constraints involved in designing such swing lock mechanisms and which constraints have limited spring sizes and, therefore, spring forces which may be utilized in holding the mirror arm in its laterally outwardly extended position in such a way as to prevent vibration and thereby assure a sharp image being viewed in the mirror. It is thus another object of the present invention to utilize a unique detent mechanism which enables the use of a spring having substantially greater mirror restraining force than has been possible in the past.

Such mirror swing lock mechanisms may not be utilized for long periods of time after being installed on a vehicle. Since such mechanisms have heretofore been entirely made of metal components, such components are subject to corrosion or rusting thereby inhibiting the protective actuation of such mechanism. Accordingly, it is a further objective of the present invention to incorporate a non-metallic spring element in the detent mechanism to eliminate such corrosion lock-up and further to provide an inherent lubricity and smoothness of action to the swing lock mechanism.

DISCLOSURE OF THE INVENTION

The mirror swing lock mechanism of the subject invention comprises a bracket member including a first portion adapted to be secured to an exterior surface of a vehicle and a second portion projecting laterally from said first portion. A mirror head is adapted to be adjustably mounted on a support arm which, in turn, is secured to the second portion of the bracket member through a suitable pivot means which allows the mirror and support arm to swing relative to the bracket member. A detent mechanism is provided for releasably retaining the mirror support arm in a position extending laterally outwardly from said bracket member for normal rearward viewing. The improvement of the subject invention is in the detent mechanism which comprises: the second portion of said bracket member having an opening therethrough and first detent means disposed about said opening; a spring member including a central opening formed therethrough and a surface having second detent means formed therein; and said pivot means including a head portion adapted to support said spring member such that the first and second detent means are in a juxtaposed relationship, a stud portion projecting from said head portion and extending through the openings in said spring member and bracket member, means for fastening said stud portion to said mirror head supporting arm for rotation therewith, and said stud portion and spring member being interconnected for rotation together. The first and second detent means are oriented such that when they are in a nesting relationship the mirror supporting arm is in its laterally outwardly extending position for normal rearward viewing. Rotation of said mirror supporting arm from said laterally outwardly extending position imparts rotation to the stud portion to move the second detent means out of nesting engagement with the first detent means.

The details of the invention are set forth in the drawings and the detailed description which follows.

BRIEF DESCRIPTION OF DRAWINGS

Reference is now made to the drawings and following description wherein the invention is described in detail.

FIG. 6 is a plan view of the non-metallic spring element of the detent mechanism;

FIG. 7 is a view along line 7—7 of FIG. 6 showing a cross-sectional view of the detent mechanism spring member;

FIG. 8 is a view along line 8—8 of FIG. 6 showing a sectional view through one of the detent recess means formed in the spring member;

FIG. 9 is a bottom view of the non-metallic spring member;

FIG. 10 is a fragmentary view through the detent mechanism showing the detent recess means of the spring member moved out of nesting engagement with the detent projection formed in the upper bracket member which occurs when the mirror, supporting arm is moved out of its laterally extended, rearward viewing position;

FIG. 11 is an elevational view of the pivot member of the detent mechanism;

FIG. 12 is a plan view along line 12—12 of FIG. 11;

FIG. 13 is a modified form of spring mechanism utilizing a pair of detent means rather than the three detent means shown in the previous drawings; and FIG. 14 is an exploded view showing the various elements of the mirror arm detent mechanism.

BEST MODE FOR CARRYING OUT THE INVENTION

Figure 1:
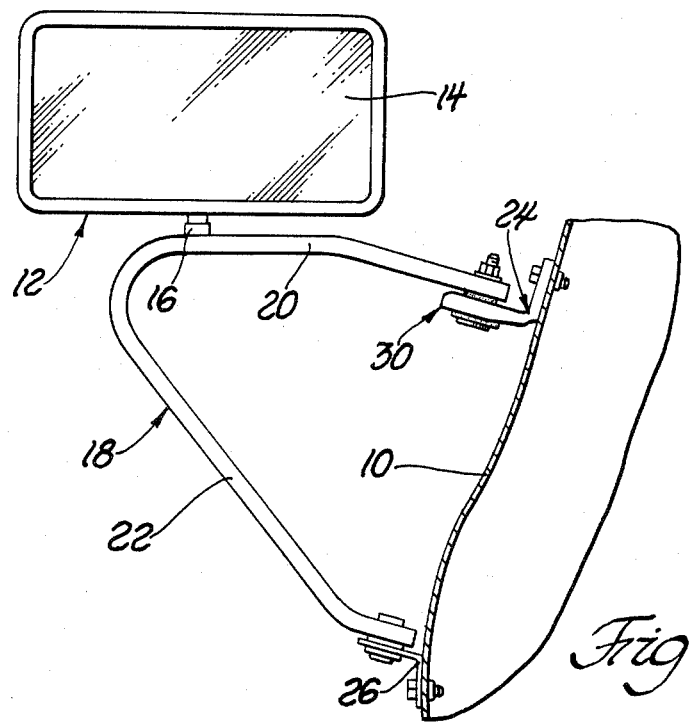
FIG. 1 is an elevational view of a mirror support mechanism embodying applicants' new and improved swing lock mechanism.

Reference is now made to FIG. 1 of the drawings wherein a side wall of a vehicle is indicated at 10 and which wall is usually part of the vehicle door. A mirror assembly is indicated generally at 12 and includes a mirror member 14 adjustably mounted through a suitable ball joint type stud 16 to a generally C-shaped supporting arm 18 which includes an upper arm portion 20 and a lower arm portion 22. The mirror supporting arm 18 is pivotally and swingably mounted to the vehicle wall 10 through suitable upper and lower bracket members 24 and 26 and their associated pivot members.

As shown in FIG. 1, the mirror 14 and its support arm 18 are positioned in the laterally extended position for normal rearward viewing. To prevent damage to the mirror and its support mechanism, mirror support arm 18 is adapted to swing either rearwardly or forwardly about the bracket pivots to move the support mechanism toward a non-viewing position generally flat against the vehicle surface.

Figure 2:
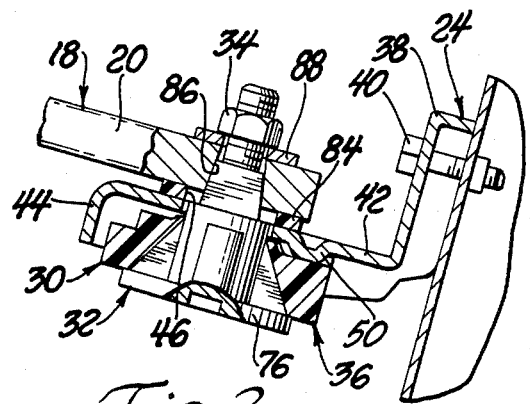
FIG. 2 is a partially sectioned enlargement showing the various elements of the swing lock mechanism.

The pivot means for the upper bracket 24 is incorporated in a detent mechanism indicated generally at 30 and shown in assembled detail in FIG. 2 of the drawings. The detent mechanism involves coaction between the upper portion 20 of mirror supporting arm 18, upper bracket 24, a pivot member 32 and its associated tightening nut 34, and a spring member 36.

The details of the upper bracket member will now be described particularly in relationship to the views of FIGS. 2, 3, 4, and 5 of the drawings. Upper bracket 24 is generally of an L-shaped construction and includes an upstanding leg portion 38 adapted to be secured to vehicle wall 10 through a suitable nut and bolt means 40. Bracket 24 also includes a generally laterally extending portion 42 the outermost end portion 44 of which turns downwardly to generally enclose spring member 36.

Figure 3:
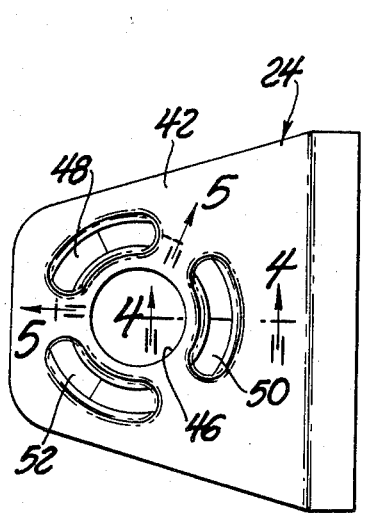
FIG. 3 is a bottom view of an upper bracket member including the detent means which form a part of the swing lock mechanism.
Figure 4:
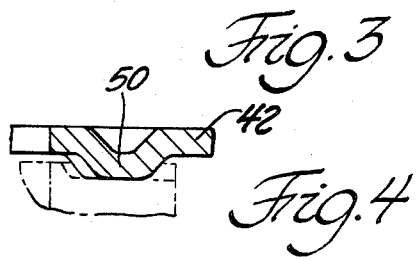
FIG. 4 is a view along line 4—4 of FIG. 3 showing the radially transverse details of one of the detent members of the upper bracket member.
Figure 5:
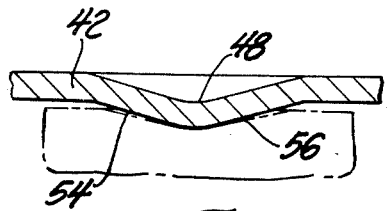
FIG. 5 is a view along line 5—5 of FIG. 3 showing a longitudinal or circumferential section through one of the bracket detent means.

As best seen in FIG. 3, laterally extending portion 42 of bracket 24 includes a central opening 46 formed therethrough and has, in a preferred embodiment, three detent elements 48, 50, and 52 disposed thereabout. The detent elements 48, 50, and 52 are of identical construction and are formed by stamping bracket portion 42 whereby the detent members project downwardly from the undersurface of the bracket. While one or more detent members may be utilized, it is found that the use of three detent members seems to provide maximum stability for the detent mechanism. Again as best seen in FIG. 3, the detent elements 48, 50, and 52 are generally concentrically arranged around the bracket opening 46. For reasons which will subsequently be made clear, each of the detent members in what may best be termed as its longitudinal or circumferential cross-section, as best seen in FIG. 5, is in the form of a flat V-shape so as to provide what may be termed flat angle ramp portions 54 and 56. Detent ramp portions 54 and 56 form acute angles of less than 30° from the plane of bracket portion 42 to provide smooth movement into and out of nesting engagement with the corresponding recesses formed in spring 36. A transverse or radial section through the apices of the flat angle ramp sections is shown in FIG. 4.

In the past, swing lock mechanisms have generally employed metallic spring elements in the detent mechanism and which metallic spring elements have either been of a coil or Belleville washer type. As seen in the earlier mentioned prior art patents, Belleville type springs have been preferred because they could be made in a generally flatter configuration than a corresponding strength coil spring. It is a unique feature of the subject swing lock mechanism that a non-metallic and monolithic spring member 36 is utilized and which spring member provides a spring force substantially greater than that achievable with either a Belleville or coil spring of corresponding vertical size.

Particularly as seen in FIGS. 6 through 9, spring member 36 is a monolithic or one-piece plastic member formed of a toroidal shape and includes a central opening 60 formed therethrough. It is necessary that spring member 36 be both resiliently compressible as well as deformable in a manner that the material recovers to its original shape after deformation. The material for spring member 36 preferred by applicants is a non-foamed or non-cellular urethane such as marketed by the Upjohn Company under the trademark "PELLE-THANE". This particular urethane material features high mechanical strength, good abrasion resistance, and the ability to produce a high spring force. The preferred hardness of the urethane material as used in the subject invention is 63±4 on the Durometer, D scale.

The spring force of the urethane spring member 36 as compared with a similar size metal spring is as follows: assuming both a metal spring and the urethane spring 36 having an uncompressed height or vertical thickness of 1½ inches when each compressed to a height of 1¼ inches results in a metal spring force of 350 lbs. while the urethane spring generates a force of 1000 lbs. The obvious advantage of the greater spring force is to maintain the mirror supporting structure more firmly so as to prevent unnecessary vibration of the mirror.

Referring further to the details of construction of spring member 36, central opening 60 of spring 36 is of cylindrical shape and also includes a plurality of vertically extending, recessed wedge portions 62 which are adapted to coact with corresponding projecting wedge sections 64 formed on pivot member 32 to permit the pivot member and the spring member to rotate together as will be subsequently described.

Spring member 36 includes a pair of spaced and generally planar surfaces 66 and 68. The upper surface 66 has detent recesses 70, 72, and 74 formed therein and which recesses correspond in shape to that of the detent elements formed in the bottom surface of bracket portion 42. The detent recesses of spring member 36 correspond in number and angular location to the detent projections of bracket 24.

Before describing the coaction between the detent projections and detent recesses, we shall complete the description of the pivot member 32 as well as the manner in which the parts are assembled.

Referring particularly to FIGS. 11, 12, and 14, pivot member 32 includes an enlarged head or base portion 76 which as seen in FIGS. 2 and 14, is adapted to support the spring member 36. An enlarged cylindrical portion 78 extends upwardly from pivot arm head portion 76 and corresponds in diametral size to that of the central opening 60 formed in spring member 36. As noted, pivot member 32 also includes four upwardly extending wedge portions 64 which are adapted to coact with the recessed wedge portions 62 of spring member 36 to create a rotary driving relationship between the pivot member and the spring member. A short and slightly tapered portion 80 of a square cross-section extends upwardly from the cylindrical portion 78 of the pivot arm which terminates in a threaded end portion 82.

Reference is now made to FIG. 14 which shows an exploded view of the various components of the mirror swing arm and detent mechanism which, when assembled, appear as shown in FIG. 2. The parts are assembled as follows: first, the spring member 36 slides over the pivot member 32 such that the pivot member wedge projections 64 and the spring member wedge recesses 62 are in registry. Next, the assembled pivot and spring members are inserted through the central opening 46 in bracket portion 42 such that the detent projections and recesses are in a nesting relationship as indicated in FIGS. 2, 4, and 5 of the drawings. As thus far assembled, the threaded and square portions 82 and 80 of the pivot member 32 project above portion 42 of bracket member 24. A thin washer member 84 is placed upon the upper surface of bracket portion 42 so as to surround the portions of the pivot member which project above the bracket member. Portion 20 of bracket arm 18 includes a square opening 86 corresponding in size and shape to the square portion 80 of the pivot member 32. Thus, as the mirror support arm 18 rotates, it in turn rotates the pivot member 32. A second washer 88 is placed about threaded portion 82 of the pivot member with nut member 34 finally threaded thereon to retain the components in the assembled relationship shown in FIG. 2. With the parts as assembled and as heretofore described, it is apparent that rotation of mirror support arm 18 will impart corresponding rotation to pivot member 32 and spring member 36.

Referring now to FIGS. 5 and 10 of the drawings, the detent action will now be described in further detail. With the detent projections 48, 50, and 52 of bracket portion 42 in nesting relationship with the detent recesses 70, 72, and 74 of spring member 36, as shown in FIGS. 2 and 5, the mirror support arm 18 is positioned in its laterally outwardly extending position of FIG. 1, to permit normal rearward viewing through mirror 14. As for example when mirror support arm 18 is forced to swing rearwardly about its bracket pivots, and as best seen by reference to FIG. 10, spring member 36 is rotated relative to bracket 24 whereby the spring detent recess members are moved out of nesting engagement with the detent projections of bracket portion 42. When it is once again desired to return the mirror support arm 18 to its normal outwardly extending position, the arm is simply rotated toward its outward position until the recess projections and recesses return to a nesting relationship at which time the mirror support arm is firmly held in its laterally extending position.

The force with which spring member 36 is held against bracket portion 42 is initially determined by the degree to which nut 34 is threaded onto threaded portion 82 of the pivot arm 32 to move the spring into engagement with bracket portion 42. The spring engaging pressure is set when the detent projections and recesses are in a nesting relationship to be certain that when the mirror support arm is in its laterally extended position the assembly will be securely supported.

Referring again to FIG. 10, it should be noted that as the spring member 36 rotates to move the detent recesses out of nesting engagement with the bracket detent projections, the bracket portion 42 does not deflect upwardly and may be considered to be rigid in relationship to spring member 36. Thus, with the relative movement of the spring member 36 relative to the bracket 24, the urethane spring material flows or is deformed by the detent projections returning its normal configuration as the spring material moves out of engagement with the detent projections. As illustrated in FIG. 10, the urethane spring material actually flows around that portion of the detent projections which are in engagement with the spring material.

It is also to be noted that the detent projections 48, 50, and 52 are always in engagement with the upper surface 66 or recesses 70, 72, 74 of spring member 36 to maintain a resistance to rotation of mirror support arm 18 relative to bracket 24. Thus, a spring force is exerted on mirror support arm 18 in any angular position thereof relative to bracket 24. While an unusually strong spring force is generated by spring 36, the inherent lubricity thereof results in a very smooth detent action.

FIG. 13 depicts a modified spring member 90 wherein two detent recess portions 92 and 94 are formed therein rather than the three recesses utilized in the modification of spring member 36. It is to be understood that with a two-detent recess spring member such as shown in FIG. 13, the bracket member would be correspondingly stamped to provide two rather than three detent projections.

Other modifications of the subject invention may be made within the intended scope of the hereinafter appended claims.

What is claimed is:

1. A mirror swing lock mechanism of the type comprising a bracket member (24) including a first portion (38) adapted to be secured to an exterior surface of a vehicle and a second portion (42) projecting laterally from said first portion, a mirror head supporting arm (18), a mirror head (14) adjustably supported upon said arm, pivot means (32) for securing one end of said arm to the second portion of said bracket member to allow said arm to swing relative to said bracket member and a detent mechanism for releasably retaining said arm in a position extending laterally outwardly from said bracket member for normal rearward viewing, the improved detent mechanism comprising:

(a) the second portion of said bracket member including
  (i) an opening (46) formed therethrough;

(ii) first detent means (48, 50, 52) disposed about said opening;
(b) a spring member (36) including
    (i) a central opening (60) formed therethrough;
    (ii) a surface (66) having second detent means (70, 72, 74) formed therein;
(c) said pivot means including
    (i) a head portion (76) adapted to support said spring member such that the first and second detent means are in a juxtaposed relationship;
    (ii) a stud portion (78, 80) projecting from said head portion and extending through the openings in said spring member and the bracket member;
    (iii) means (80, 86) for engaging said stud portion to said mirror head supporting arm for rotation therewith; and
    (iv) means (62, 64) interlocking said stud portion and spring member for rotation together;
the first and second detent means being oriented such that when they are in a nesting relationship the mirror supporting arm is in its laterally outwardly extending position for normal rearward viewing, rotation of said arm from said laterally outwardly extending position imparting rotation to the stud portion to move the second detent means out of nesting engagement with the first detent means.

2. A mirror swing lock mechanism as set forth in claim 1 wherein said spring member is a deformable and compressible material and is of a monolithic form.

3. A mirror swing lock mechanism as set forth in claim 2 wherein rotation of the spring member relative to the bracket causes the adjacent spring material to deform as the first and second detent means move out of nesting engagement.

4. A mirror swing lock mechanism as set forth in claim 1 in which said spring member is of toroidal shape and includes upper and lower faces (66 and 68), said second detent means being formed in one of said faces.

5. A mirror swing lock mechanism of the type set forth in claim 1 wherein said first and second detent means are of a flat V cross-section wherein the legs of the V make an acute angle of not more than 30° to the respective adjacent surfaces of the bracket and spring member.

6. A mirror swing lock mechanism of the type set forth in claim 1 wherein said spring member is formed of a non-metallic material having a D scale durometer in the range of 50 to 75.

7. A mirror swing lock mechanism of the type set forth in claim 1 wherein said spring member is formed of a resiliently deformable non-foam urethane material.

8. A mirror swing lock mechanism of the type set forth in claim 1 wherein said spring member is of cylindrical shape and includes a pair of axially spaced surfaces (66, 68), said second detent means formed in one of said surfaces, said second detent means containing the surface being resiliently deformed relative to the other of said pair of surfaces by said first detent means as said spring member rotates relative to the bracket member.

9. A mirror swing lock mechanism of the type set forth in claim 8 wherein said spring member is formed of a non-metallic material having a D scale durometer in the range of 50 to 75.

10. A mirror swing lock mechanism of the type set forth in claim 8 wherein said spring member is formed of a resiliently deformable non-foam urethane material having a D scale durometer in the range of 50 to 75.

11. A mirror swing lock mechanism as set forth in claim 1 wherein the interlocking means comprises a plurality of recesses (62) extending radially from the central opening in the spring member and a plurality of projections (64) extending radially from the stud portion of the pivot means, said projections extending within said recesses.

12. A mirror swing lock mechanism of the type comprising a bracket member (24) including a first portion (38) adapted to be secured to an exterior surface of a vehicle and a second portion (42) projecting laterally from said first portion, a mirror head supporting arm (18), a mirror head (14) adjustably supported upon said arm, pivot means (32) for securing one end of said arm to the second portion of said bracket member to allow said arm to swing relative to said bracket member, said pivot means including a detent mechanism for releasably retaining said arm in a position extending laterally outwardly from said bracket member for normal rearward viewing, the improved detent mechanism comprising:
(a) the second portion of said bracket member including
    (i) an opening (46) formed therethrough;
    (ii) detent projection means (48, 50, 52) disposed about said opening;
(b) a spring member (36) including
    (i) a central opening (60) formed therethrough;
    (ii) a surface (66) having detent recess means (70, 72, 74) formed therein;
(c) said pivot means including
    (i) a head portion (76) adapted to support said spring member such that the detent projection means and the spring surface are always in an abutting relationship;
    (ii) a stud portion (78, 80) projecting from said head portion and extending through the openings in said spring member and the bracket member;
    (iii) means (80, 86) for engaging said stud portion to said mirror head supporting arm for rotation therewith;
    (iv) means (62, 64) interlocking said stud portion and spring member for rotation together;
the spring detent recess means and the bracket detent projection means being oriented such that when the latter is in nesting engagement within the former the mirror supporting arm is in its laterally outwardly extending position for normal rearward viewing, rotation of said arm from said laterally outwardly extending position imparting rotation to the spring member to move the spring detent recess out of nesting engagement with the bracket detent projection means.

13. A mirror swing lock mechanism as set forth in claim 12 wherein said spring member is a deformable and compressible material and is of a monolithic form.

14. A mirror swing lock mechanism as set forth in claim 13 wherein rotation of the spring member relative to the bracket causes the adjacent spring material to deform and at least partially surround the detent projection means.

15. A mirror swing lock mechanism as set forth in claim 12 in which said spring is of toroidal shape and includes upper and lower faces, said detent recess means being formed in one of said faces.

16. A mirror swing lock mechanism as set forth in claim 12 wherein the centers of the detent projections are circumferentially spaced at 120° from each other and the detent recesses are also circumferentially spaced at 120° from each other.

* * * * *